US 6,989,509 B2
(12) United States Patent
Silvestro (10) Patent No.: US 6,989,509 B2
(45) Date of Patent: *Jan. 24, 2006

(54) SELF-CONTAINED INTEGRATED WELDER/GENERATOR AND COMPRESSOR

(75) Inventor: Nino Silvestro, Independence, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/390,436

(22) Filed: Mar. 17, 2003

(65) Prior Publication Data

US 2004/0182846 A1    Sep. 23, 2004

(51) Int. Cl.
 B23K 9/10    (2006.01)
(52) U.S. Cl. .................................. 219/133; 290/1 A
(58) Field of Classification Search ................ 219/133, 219/134; 290/1 A, 1 R, 40 R
See application file for complete search history.

(56) References Cited

U.S. PATENT DOCUMENTS

| 1,929,887 | A | * | 10/1933 | Gustafson ................ 417/27 |
| 2,836,736 | A | | 5/1958 | Johnson |
| 2,999,950 | A | | 9/1961 | Johnson |
| 3,227,979 | A | | 1/1966 | Kamp |
| 3,659,183 | A | | 4/1972 | Carlson |
| 3,720,842 | A | | 3/1973 | Martin et al. |
| 4,173,951 | A | | 11/1979 | Ishihara |
| 4,293,281 | A | | 10/1981 | Lamoreaux |
| 4,465,920 | A | | 8/1984 | Hoyt, Jr. et al. |
| 4,698,975 | A | | 10/1987 | Tsukamoto et al. |
| 5,341,644 | A | | 8/1994 | Nelson |
| 5,386,873 | A | | 2/1995 | Harden et al. |
| 5,795,136 | A | | 8/1998 | Olsaker et al. |
| 5,907,970 | A | | 6/1999 | Havlovick et al. |
| 5,928,535 | A | | 7/1999 | Trinkner et al. |
| 6,051,809 | A | * | 4/2000 | Colella ................ 219/133 |
| 6,065,942 | A | | 5/2000 | Glidden et al. |
| 6,099,265 | A | * | 8/2000 | Rowe et al. ............. 417/313 |
| 6,172,332 | B1 | | 1/2001 | Trinkner et al. |
| 6,263,926 | B1 | | 7/2001 | Bender et al. |
| 6,296,027 | B1 | | 10/2001 | Bender et al. |
| 6,331,694 | B1 | | 12/2001 | Blankenship |
| 6,362,533 | B1 | | 3/2002 | Morohoshi et al. |
| 6,435,925 | B1 | | 8/2002 | Mabru |
| 6,472,635 | B2 | * | 10/2002 | Trinkner et al. ......... 219/133 |
| 6,534,958 | B1 | * | 3/2003 | Graber et al. ............. 322/11 |

(Continued)

FOREIGN PATENT DOCUMENTS

DE    3739726    9/1989

(Continued)

OTHER PUBLICATIONS

U.S. Appl. No. 09/411,106 filed Oct. 4, 1999.

(Continued)

Primary Examiner—Kevin P. Kerns
(74) Attorney, Agent, or Firm—Fay Sharpe Fagan Minnich & McKee; Brian E. Turung; Robert V. Vickers (57) ABSTRACT

An integrated welder, generator and compressor unit that includes a housing that at least partially contains components of a welder, generator and compressor. An engine, an electric current generator, and an air compressor are at least partially mounted in the housing. The electric current generator is at least partially connected to the engine to be at least partially driven thereby. A drive connector at least partially connects the air compressor to the engine and/or electric current generator. The drive connector includes a gear box that has at least one gear.

44 Claims, 5 Drawing Sheets

U.S. PATENT DOCUMENTS

| | | | |
|---|---|---|---|
| 6,596,972 B1 * | 7/2003 | Di Novo et al. | 219/137.9 |
| 6,619,337 B1 * | 9/2003 | Vickers | 141/98 |
| 6,660,967 B2 * | 12/2003 | Brofft et al. | 219/133 |
| 6,670,580 B2 * | 12/2003 | Brofft et al. | 219/134 |
| 6,674,046 B2 * | 1/2004 | Bankstahl et al. | 219/133 |
| 6,909,068 B1 | 6/2005 | Alleman, Jr. et al. | |
| 6,933,465 B2 | 8/2005 | Bankstahl et al. | |
| 2004/0104209 A1 | 6/2004 | Bankstahl et al. | |
| 2004/0182846 A1 | 9/2004 | Silvestro | |

FOREIGN PATENT DOCUMENTS

| | | | |
|---|---|---|---|
| FR | 2331414 | | 6/1977 |
| FR | 2 331 414 | * | 7/1977 |
| WO | WO 0236948 | | 5/2002 |

OTHER PUBLICATIONS

U.S. Appl. No. 09/906,426 filed Jul. 17, 2001, now U.S. Appl. No. 6,596,972.

Brochure by Miller Electric Mfg. Co. dated Sep. 1996.

Brochure by Miller Electric Mfg. Co. dated Oct. 1996.

Brochure by Lincoln Electric regarding Ranger 9 dated May 1995.

Brochure by Miller Electric Mfg. Co. regarding Big Blue Air Pak dated Jul. 2002.

* cited by examiner

SELF-CONTAINED INTEGRATED WELDER/GENERATOR AND COMPRESSOR

The present invention relates generally to engine driven welding machines, and more particularly to a welder/generator and compressor unit that can be transported to a site for welding and/or for operating air or electric power tools.

BACKGROUND OF THE INVENTION

Engine driven welding machines include a gas powered engine to run a generator which supplies power to the welding electrode. Two such engine welders are disclosed in U.S. Pat. Nos. 6,296,027 and 6,172,332, both of which are incorporated herein by reference. The generator can also be used to operate other electrical equipment (e.g., lights, pumps, etc.). On a construction site, welding equipment and other types of equipment are commonly used. The engine driven welder is commonly used to provide electrical power to electric welders, lights, power tools, etc. Air powered tools are also commonly used at a construction site. Such tools are typically powered by a separate air compressor.

While both of these units have satisfactorily provided power to various tools at construction sites, the use of both an air compressor and an engine driven welder has some disadvantages. Although the engine welder and air compressor are portable, it is nevertheless difficult and time consuming to load and unload these two separate units, and then position and setup the various components which are to be used with such units. In addition, the two separate units require a certain amount of space in a transport vehicle, thus can result in multiple vehicles having to be used to transport all the components associated with the two units. Furthermore, some air compressors are powered by electricity. When such electric compressors are used at a work site, the air compressor may be plugged into and powered by the generator of the engine welder, thus reducing the available power for use with other power tools.

In an effort to address the past problems associated with the use of a separate engine welder and air compressor, a self contained integrated welder/generator and compressor is disclosed in U.S. Pat. No. 6,051,809, which is incorporated herein by reference. The '809 patent discloses a self-contained and fully integrated welder/generator and compressor unit that is capable of being loaded onto and carried by a pickup truck. The welder/generator and compressor unit include a housing having a length that generally corresponds to the width of a pickup truck and having a vertical height for receiving and containing components of the welder/generator and compressor unit (e.g., compressor, generator, welder electronics, engine, fuel tank, etc.). An engine and an electrical current generating alternator are mounted within the housing of the welder/generator and compressor unit. The electrical current generating alternator is connected to the engine to be driven thereby, and the alternator includes an output drive shaft that drives a belt which in turn powers an air compressor. The housing includes an output panel that includes electrical outlets, welding lead receptacles, air compressor outlets, etc.

Although the '809 patent addresses some of the disadvantages associated with a separate engine welder and air compressor, several problems still remain. The housing of the welder/generator and compressor unit is specifically designed to fit in the rear of a pickup truck. If the pickup truck cannot be positioned near a particular work site, the welder/generator and compressor unit must be removed from the pickup truck and carried to the particular work site. Furthermore, the '809 patent discloses that the air compressor is connected to the shaft of the alternator by a belt which can require periodic maintenance. In addition, belt drives typically include a crankshaft pulley(s) and may use a magnetic clutch to control the belt drive. These components have a tendency to quickly wear out, thereby requiring periodic maintenance.

In view of the state of the prior art, there remains a need for a unit that can provide both electrical power and air pressure for use by various types of tools at a work site, and which unit can be easily transported to various work site locations, and which unit is easier to operate and maintain.

SUMMARY OF THE INVENTION

The present invention is directed to an engine driven welder and compressor unit that can be conveniently transported to a site for welding and/or for operating air and/or electric power tools, and more easily operated and maintained by a user.

In accordance with the present invention, there is provided a self-contained and fully integrated welder/generator and compressor unit. The integrated welder/generator and compressor unit is provided with a housing to protect the internal components of the welder. At least partially protected by the housing is a fuel powered engine and an electric generator. The fuel powered engine runs the electric generator which in turn produces electricity for the arc welder. The electric generator is selected to produce electricity for various types of welders, such as TIG welders, plasma arc welders, MIG welders, STT or other waveform welders, and the like. Electric circuitry can be included within the housing to control the amount of current, voltage, power and/or the waveform of current directed to the electrode of the welder. A fuel tank is typically provided within the housing to supply fuel to the fuel powered motor. The fuel tank can be positioned in various areas within the housing, but is generally positioned at or near the base of the housing or engine welder. A filler tube is typically connected to a portion of the fuel tank and extends upwardly from the fuel tank and through a portion of the housing to enable an operator to refill the fuel tank. The filler tube and fuel tank can be made from one or multiple pieces of material. The filler tube and fuel tank are typically made of a durable material such as, but not limited to, plastic and/or a metal material. The engine welder typically includes a control panel to operate various internal components of the welder and/or to provide connectors to various components of the welder. A fixed or adjustable exhaust pipe for the fuel power engine can be included on the engine powered welder. These and other standard components of an engine driven welder are disclosed in U.S. Pat. Nos. 6,172,332 and 6,296,027, which are incorporated herein by reference. The engine welder can be transported by a welding carriage; however, this is not required. One non-limiting welding carriage which can be used is disclosed in Assignee's U.S. patent application Ser. No. 09/411,106, filed Oct. 4, 1999, which is incorporated herein by reference. The engine powered welder can also include a filler tube and fuel tank arrangement that includes a fuel gauge to monitor the fuel level in the filler tube and/or fuel tank; however, this is not required. The fuel gauge, when used, enables an operator to monitor fuel levels within the filler tube and/or fuel tank to enable an operator to anticipate when the engine welder needs to be refueled and/or to notify an operator during the refueling process of the fuel tank when the fuel tank is filled, thereby avoiding spillage and waste of fuel. The minimizing of spillage can reduce damage to the welder and/or components about the welder, and the time and money required for clean-up of the spilled fuel. One non-limiting configuration of the filler tube and fuel tank that can be used is disclosed in U.S. Pat. Nos. 6,172,332 and 6,296,027, which are incorporated herein by reference. A grommet or insert can also be used in the fueling cavity of the housing. The grommet or insert, when used, is designed to at least partially seal the region about the fueling cavity to inhibit and/or prevent fluids from entering the interior of the housing. One non-limiting configuration of a grommet or insert that can be used is disclosed in U.S. Pat. Nos. 6,172,332; 6,296,027; and 6,619,337, which are incorporated herein by reference. In one embodiment of the invention, the air compressor that is at least partially positioned in the housing can be connected to the engine (e.g. drive shaft, auxiliary shaft, etc.) and/or electrical alternator in the housing. Many types of air compressors can be used.(e.g., piston or reciprocating compressors, rotary or screw compressors, centrifugal or axial compressors, etc.). The air compressor can have a compressed air outlet mounted to the housing. Unlike the connection disclosed in U.S. Pat. No. 6,051,809, the air compressor is connected to the drive shaft of the engine and/or electrical alternator by a gear box. In one aspect of this embodiment, the gear box can have a single gear ratio or multiple gear ratios to thereby control the desired speed of the compressor. The use of the gear box eliminates the need for a belt that must be periodically replaced and/or the tension being periodically adjusted. The use of the gear box also allows the speed of the compressor to be better controlled. The gear box can, in some designs, simplify and/or reduce the space requirements needed to connect the compressor to the drive shaft of the engine and/or electrical alternator. The gear box, in effect, simplifies the assembly of the integrated welder/generator and compressor unit by reducing the number of components needed to connect the gear box between the air compressor and the engine and/or electric current generator. The use of the gear box also can result in reduced cost due to the simpler design and fewer parts. The use of the gear box further results in less maintenance since the gear box is more durable than a belt and pulley system, especially one that utilizes one or more clutches (e.g. magnetic clutches, etc.). In another and/or alternative aspect of this embodiment, the air compressor is connected to the engine by a gear box. In another and/or alternative embodiment of the invention, a compressed air accumulator tank can be at least partially mounted in the housing and be connected to the compressed air output of the air compressor. When an accumulator tank is used, a compressed air outlet is typically mounted to the housing to enable air powered equipment to be powered by the compressed air in the accumulator tank. In still another and/or alternative embodiment of the invention, the accumulator tank and/or air compressor includes one or more pressure monitors and/or pressure valves. The one or more pressure monitors and/or pressure valves are designed to at least partially monitor and/or control the air pressure of one or more components. For instance, a pressure monitor and a pressure valve can be connected to the accumulator tank to monitor and/or display the pressure in the accumulator tank. When the pressure approaches or exceeds a maximum pressure, the pressure monitor and/or a pressure valve can a) allow air or cause air to be released from the accumulator tank, and/or b) cause a slow down and/or disengagement of the air compressor via gear box or other mechanism to reduce to stop the flow of compressed air into the accumulator tank. As can be appreciated, a pressure monitor and a pressure valve can be connected to other and/or additional components in the housing to monitor the pressure, display the pressure, release the pressure and/or to control the pressure. In yet another and/or alternative embodiment of the invention, the housing can include one or more storage compartments adapted to store various welding tools, air tools, and/or supplies within the housing. The arrangement of the one or more storage compartments can be similar to the arrangement disclosed in U.S. Pat. No. 6,596,972, which is incorporated herein by reference.

The principal object of the present invention is to provide an engine welder that can supply power to welding equipment and compressed air to various types of air tools.

Another object of the present invention is to provide an engine welder that is more convenient and easier to operate.

Still another and/or alterative object of the present invention is to provide an engine welder which is easier to set up and/or transport to various locations.

Yet another and/or alterative object of the present invention is to provide an engine welder which is easy to assemble, easy to connect the welding accessories of a welder to the housing, easy to connect the air tools to the housing, and/or easy to transport the welding accessories and/or air tools along with the engine welder to various locations.

Still yet another and/or alternative object of the present invention is to provide an engine welder that includes an air compressor.

A further and/or alternative object of the present invention is to provide an engine welder that includes a drive for an air compressor that is simple, reliable and durable.

Still a further and/or alternative object of the present invention is to provide an engine welder that includes a pressure monitoring system that monitors and/or controls the pressure in one or more components of the engine welder.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

DESCRIPTION OF PREFERRED EMBODIMENTS

Figure 1:
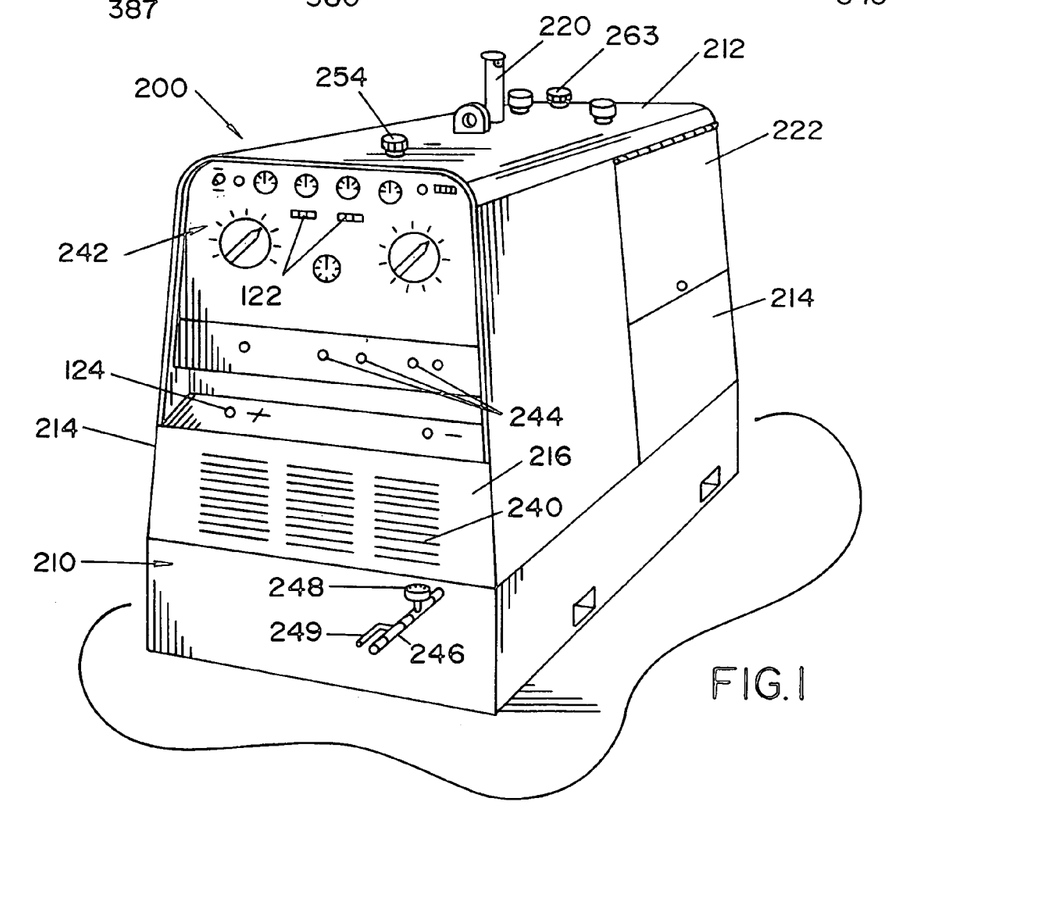
FIG. 1 is a perspective view of an assembled engine welder in accordance with the present invention.
Figure 2:
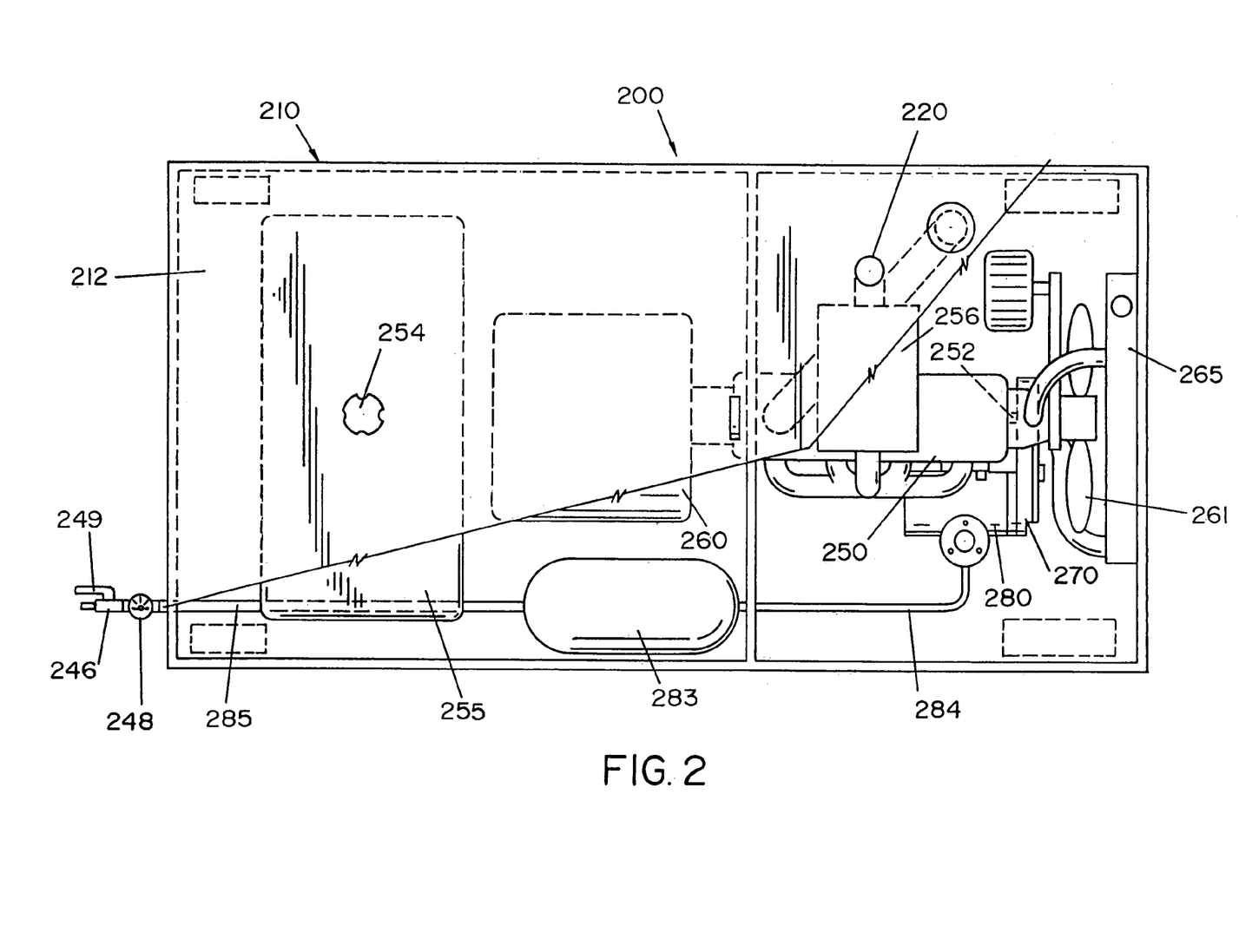
FIG. 2 is an enlarged top plan view, shown with parts broken away, of a preferred gear box arrangement between the air compressor pump and the drive shaft of the electric alternator contained within the engine welder of FIG. 1.

Referring now to the drawings, wherein the showings are for the purpose of illustrating the preferred embodiments of the invention only and not for the purpose of limiting the same, FIGS. 1–5 illustrate one embodiment of the invention. FIGS. 1 and 2 illustrate a self-contained, portable and fully-integrated welder/generator and compressor unit 200 in accordance with the present invention. Unit 200 includes a housing 210 that has a top portion 212 and two side portions 214. The welding housing is designed to encase at least a portion of the internal components of the engine welder. Positioned in the top portion 212 of welding housing 210 is an exhaust pipe opening 220. A motor access opening 222 is located on one side of housing 210.

The front face 216 of housing 210 includes a vent 240 to allow air flow within the housing to thereby cool the internal components of the welder/generator and compressor unit. The front face also includes various switches, knobs, indicator lights and meters and gauges 242 to monitor and control the operation of the welder/generator and compressor unit. The front face also includes electrical connectors 244 to connect a welding gun and/or other electrical equipment to the welder/generator and compressor unit. Typically the front face includes two 120 volt receptacles 122, a 220 volt receptacle 124, and a plurality of conventional welding sockets. As can be appreciated, the voltage rating can be other than 120 and/or 220 volts (e.g. 230V, 240V, 380V, 400V, etc.). As can be further appreciated, one or less volt receptacles can be positioned on the front face and/or other locations on the welder/generator and compressor unit. The front face and/or one or more other faces of the welder/generator and compressor unit can also include one or more features—e.g., an on/off key slot, a start button for the internal combustion engine, one or more circuit breakers, a light, voltage and/or current meters, welding current settings, warning indicators, etc. A compressed air outlet 246 is accessible from the face of housing 210 to supply compressed air to various types of air power tools (e.g., nail gun, paint gun, pressure washer, sand blaster, etc.). As can be appreciated, more than one compressed air outlet can be accessible on the face of the housing. As can also be appreciated, one or more compressed air outlet can be located on other regions of the housing. The compressed air outlet can include a pressure gauge 248 to monitor the pressure from the outlet and a valve 249 to control the flow of compressed air through the outlet; however, this is not required. Alternatively, the pressure gauge can be located on other regions on the housing.

Figure 3:
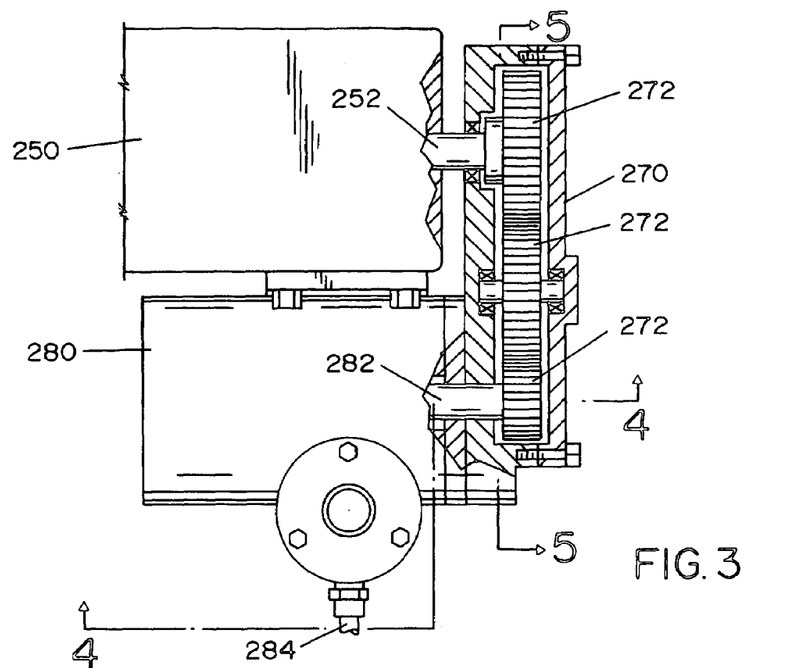
FIG. 3 is an enlarged top plan view of a cutaway portion of the gear box of FIG. 2.
Figure 4:
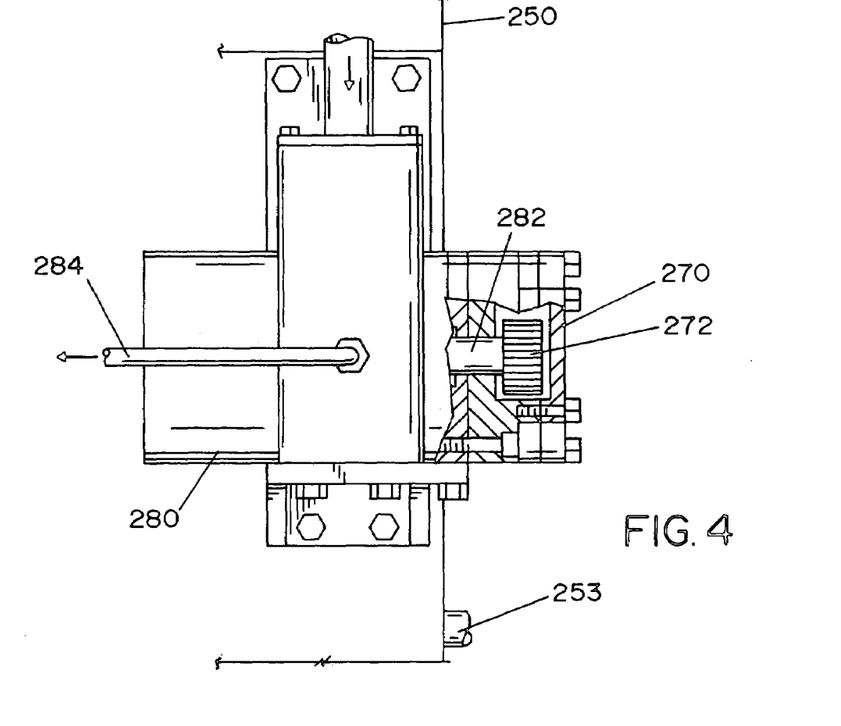
FIG. 4 is a cross-sectional view along line 4—4 of FIG. 3.
Figure 5:
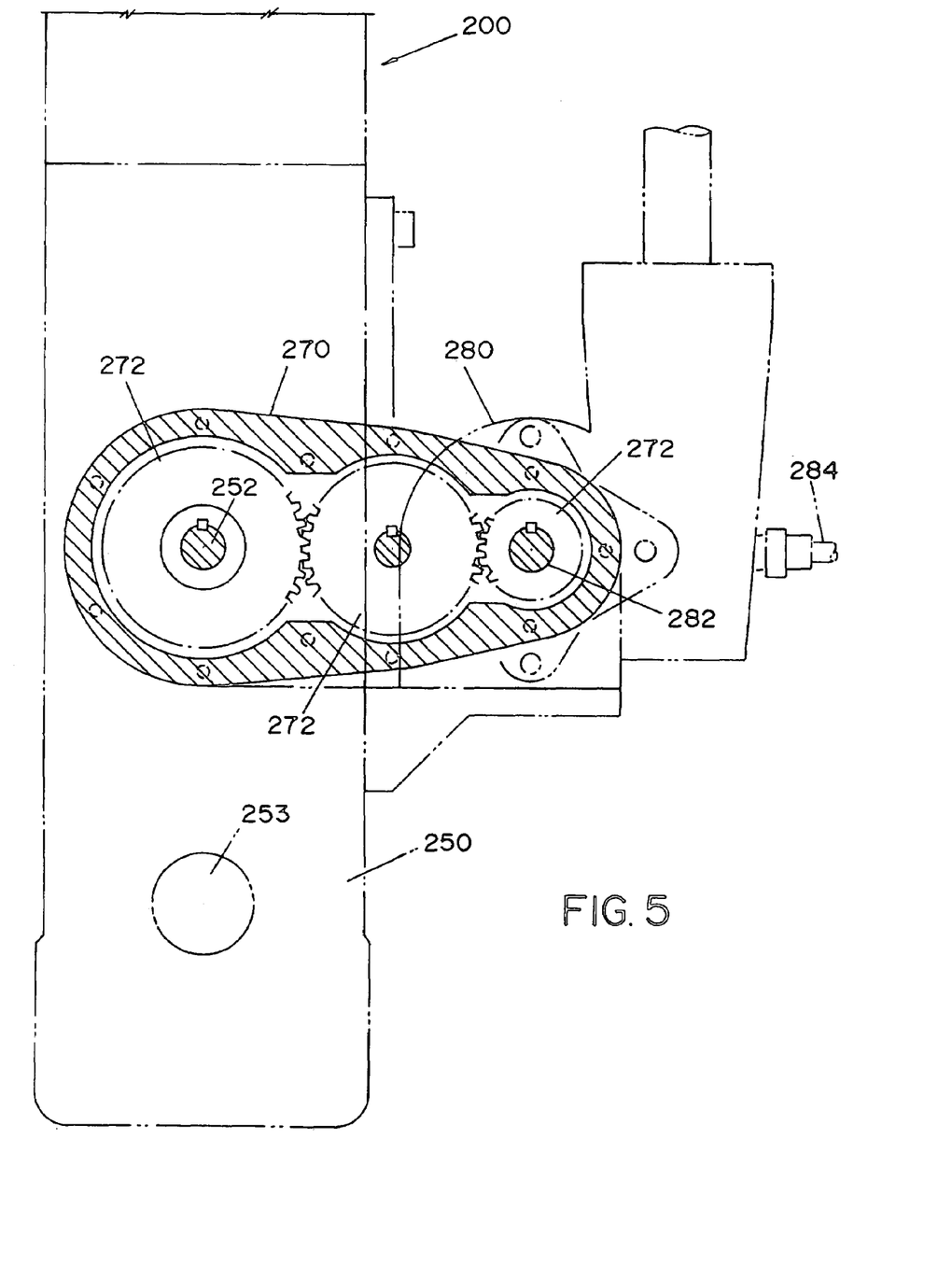
FIG. 5 is a cross-sectional view along line 5—5 of FIG. 3.

Contained within the housing 210 is an internal combustion engine 250 (See FIG. 2) that is mounted at one end of the housing 210. The internal combustion engine is typically provided with an air cleaner, a muffler 256, and a battery for starting the engine. A fan 261 and a radiator 265 having a radiator cap 263 for cooling the engine are also typically provided in the housing. A fuel tank 255 supplies fuel to the engine. The fuel tank includes a cap 254 located on the top of the housing to enable refilling of the fuel tank. A fuel gauge (not shown) is positioned on the housing to indicate the fuel level in the fuel tank. An electric current generator 260 is mounted within the housing 210. The electric current generator is connected to internal combustion engine 250 by a motor shaft (not shown). The motor shaft is typically directly connected to electric current generator 260; however, a gear box and/or belt drive, not shown, can be inserted therebetween to control and/or regulate the speed at which the electric current generator is operated by internal combustion engine 250. In one particular, non-limiting arrangement, internal combustion engine 250 is a 500 or 700 amp water cooled and/or air cooled engine. The engine is designed to operate at 1800 RPM when the current output is set at least at 500 amps. The auxiliary power provided by the electric current generator is about 60 hertz and about 1–20 kW so as to be able to run standard power tools and lights. As can be appreciated, other sized engines and/or alternators can be used. Engine 250 includes an auxiliary drive output shaft 252 which is connected to a gear box 270 as illustrated in FIGS. 3–5. A primary drive 253 is typically connected to the fan. Gearbox 270 can be a single ratio gear box or a multiple ratio gear box. Typically a single gear ratio is used. The gear box includes several gears 272, which connect output shaft 252 to a compressor shaft 282 of rotary screw compressor 280. When the gear box has multiple gear ratios, the gearing ratio can be manually or automatically set. Compressor 280 is mounted within housing 210. An air accumulator tank 283 can be connected to compressor 280; however, this is not required. When an air accumulator is used, a pipe or hose 284 conveys air from compressor 280 to air accumulator 283. A pipe or hose 285 conveys air from the air accumulator to outlet 246. When an air accumulator is not used, pipe or hose 284 conveys air from compressor 280 to outlet 246. Housing 210 can include one or more compartments, not shown, that provide a storage area for welding tools, nail guns, electric saws, lights, etc.

It will be appreciated that the present invention provides a self-contained, portable and fully integrated unit 200 that can be easily and conveniently transported to various work sites for use in welding, providing auxiliary electric power, and/or compressed air. In addition, the housing of the internal combustion engine, electric alternator, and the air compressor results in a noise level reduction, thereby improving the work environment. Furthermore, the combined welder and air compressor in the housing facilitates in the quick and easy connection and removal of welding equipment, electrical equipment and/or air tools on the housing.

Figure 6:
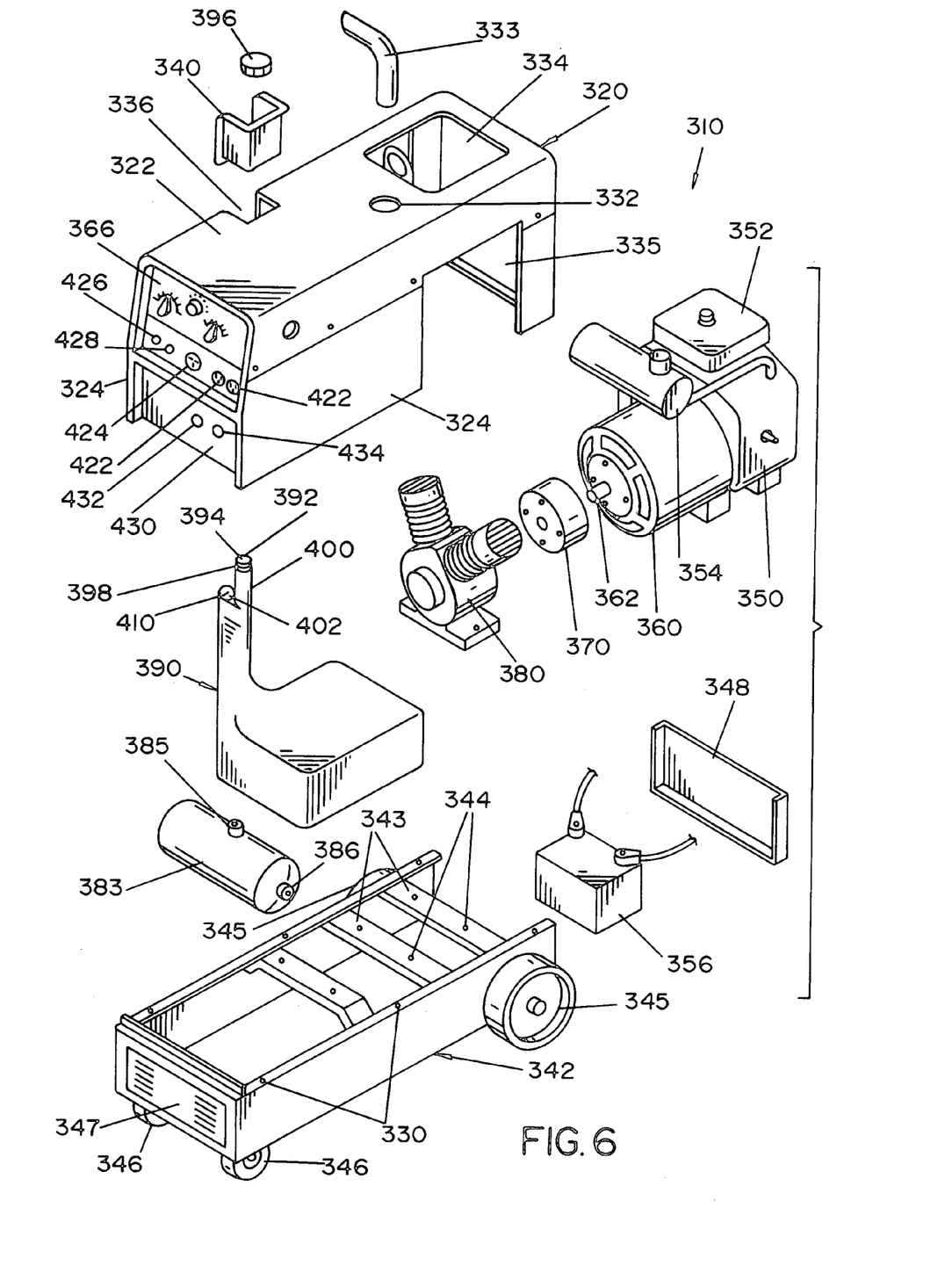
FIG. 6 is an exploded perspective view of an alternative embodiment of a housing of an engine welder in accordance with the present invention; and, FIG. 7 is an enlarged top plan view of the gear box arrangement between the air compressor pump and the drive shaft of the electric alternator.
Figure 7:
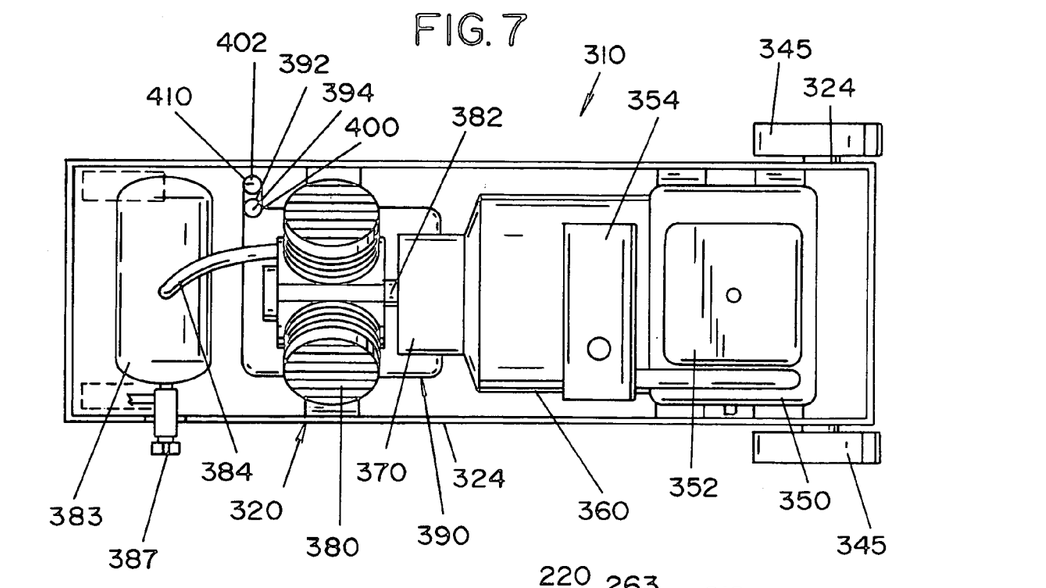

Reference is now made to FIGS. 6 and 7 which illustrate another embodiment of the present invention. FIGS. 6 and 7 illustrate a self-contained, portable and fully-integrated welder/generator and compressor unit 310. Welder/generator and compressor unit 310 includes a housing 320 that includes a top portion 322 and two side portions 324. The welding housing is designed to encase at least a portion of the internal components of the engine welder. Positioned in the top portion 322 of welding housing 320 is an exhaust pipe opening 332 and a motor access opening 334. As can be appreciated, the motor access opening can be positioned on other regions of the housing. An exhaust pipe 333 is connected in pipe opening 332. The one side of housing 320 includes another motor access opening 335.

Positioned in the top and side portion of the welding housing 320 is a grommet or insert 340. Grommet or insert 340 is positioned in the fueling cavity 336 of the welding housing 320. Fueling cavity 336 is formed by a cut-out section of the top section and side portion of the welding housing. As shown in FIG. 6, grommet or insert 340 is inserted into fueling cavity 336 and seals the fueling cavity to inhibit or prevent fluids from entering the interior of the welding housing. As can be appreciated, the use of a grommet or insert can be eliminated from the housing. A fuel tank 390 is positioned and secured into the base of the engine welder. As can be appreciated, the fuel tank can be positioned in other regions within the housing. Fuel tank 390 supplies fuel to the fuel powered motor in the engine welder. Formed on the top portion of fuel tank 390 is a filler tube 400 which extends upwardly from fuel tank 390 and to fueling cavity 336 in welding housing 320. As can be appreciated, a fueling cavity can be eliminated from the housing. Top portion 392 of filler tube 400 includes an opening 394 wherein an opening cap 396 is secured to the top of the opening by threads 398. Opening cap 396 is removed when fuel is to be added to fuel tank 390 and resealed onto opening 394 once fueling has been completed. A fuel gauge 410 includes a level indicator 402 to provide fuel level information. As can be appreciated, the fuel gauge can be another type of fuel gauge (e.g., an electronic fuel gauge, etc.). During a fueling operation, an operator is able to monitor the fuel level indicator on fuel gauge 410 to determine when fuel tank 390 is filled.

Several mount holes 330 are positioned about the welding frame 342 to enable welding housing 320 to be secured to the frame of the engine welder. Welding frame 342 includes several cross bars 343 which have connection openings 344 to provide structural support for the welding frame, to provide a seat, and/or to provide a connection point for one or more components in the welding housing (e.g. motor, generator, air compressor, etc.). The welding frame also includes rear wheels 345 and front pivot wheels 346 to enable the engine welder to be moved to various work sites. As can be appreciated, the housing does not require wheels. When the housing does not have wheels, the housing can be moved by used of a welding carriage or the like. The welding housing includes a vent 347 to provide air flow into and/or out of the interior of housing 320. The rear of the welding frame includes a back panel 348 that allows access to battery 356.

As stated above, fuel tank 390 provides fuel to an internal combustion engine 350 that is mounted at one end of the housing 320. The internal combustion engine is typically provided with an air cleaner 352, a muffler 354, and a battery 356 for starting the engine. An electric current generator 360 is mounted within the housing 320. The electric current generator is connected to internal combustion engine 350 by a flywheel (not shown). The flywheel is typically directly connected to electric current generator 360; however, a gear box and/or belt drive, not shown, can be inserted therebetween to control and/or regulate the speed at which the electric current generator is operated by internal combustion engine 350. Electric current generator 360 is connected to a gear box 370 by shaft 362. Gear box 370 can be a single ratio gear box or a multiple ratio gear box. The gear box includes one or more gears, not shown, which connects the electric current generator to a compressor shaft 382 of piston compressor 380. As can be appreciated, other types of compressors can be used (e.g. rotary screw compressor, etc.). When the gear box has multiple gear ratios, the gearing ratio can be manually or automatically set. Compressor 380 is mounted within housing 320. An air accumulator tank 383 can also be mounted in the housing; however, this is not required. A hose 384 conveys air from compressor 380 to air accumulator 383. Air accumulator 383 includes a top opening 385 that is connectable to one end of hose 384. The air accumulator also includes a valve connector 386 that is connectable to one or more valves that are in turn connectable to air hoses used to power air powered equipment (e.g., nail gun, paint gun, pressure washer, sand blaster, etc.). When an air accumulator is not used, hose 384 conveys air from compressor 380 to valve connector 386. A pressure release valve 387 can be connected to valve connector 386 of air accumulator 383. The pressure release valve releases pressure from the air accumulator when the pressure inside the air accumulator exceeds a maximum pressure. Housing 320 can include one or more compartments, not shown, that provide a storage area for welding tools, nail guns, electric saws, lights, etc.

One or more walls of housing 320 can include an air inlet and/or outlet for the components in the housing. The housing also includes an output panel 366 that includes a plurality of outlets for use by welders using the present invention. The output panel 366 includes two 120 volt receptacles 422, a 220 volt receptacle 424, and a plurality of conventional welding sockets 426, 428. As can be appreciated, the voltage rating can be other than 120 and/or 220 volts (e.g. 230V, 240V, 380V, 400V, etc.). As can be further appreciated, one or less volt receptacles can be positioned on the front face and/or other locations on the welder/generator and compressor unit. The output panel can also include an on/off key slot, a start button for the internal combustion engine 320, one or more circuit breakers, a light, voltage and/or current meters, welding current settings, warning indicators, etc. A second output panel 430 includes one or more air compression ports 432, 434 that are adapted to connect one or more air hoses of air powered equipment. The compressed air, from the air compression ports, can be used to operate one or more air tools (e.g., nail gun, paint gun, pressure washer, sand blaster, etc.). In one particular, non-limiting arrangement, the internal combustion engine is a 500 or 700 amp water cooled and/or air cooled engine. The engine is designed to operate at 1800 RPM when the current output is set at least at 500 amps. The auxiliary power provided by the electric current generator is about 60 hertz and about 1–20 kW so as to be able to run standard power tools and lights. As can be appreciated, other sized engines and/or alternators can be used.

It will be appreciated that the present invention provides a self-contained, portable and fully integrated unit 310 that can be easily and conveniently transported to various work sites for use in welding, providing auxiliary electric power, and/or compressed air. In addition, the housing of the internal combustion engine, electric alternator, and the air compressor results in a noise level reduction, thereby improving the work environment Furthermore, the combined welder and air compressor in the housing facilitates in the quick and easy connection and removal of welding equipment, electrical equipment and/or air tools on the housing.

The invention has been described with reference to a preferred embodiment and alternates thereof. It is believed that many modifications, alterations to the embodiments disclosed readily suggest themselves to those skilled in the art upon reading and understanding the detailed description of the invention. It is intended to include all such modifications and alterations in so far as they come within the scope of the present invention.

I claim:

1. A portable integrated welder, generator and compressor unit comprising:
   a. a housing that at least partially contains components of said welder, generator and compressor, said housing including wheels to enable said housing to be rolled over a ground surface;
   b. an engine at least partially mounted in said housing;
   c. an electric current generator at least partially mounted in said housing and connected or interconnected to said engine to be at least partially driven thereby;
   d. an air compressor at least partially mounted in said housing; and e. a beltless and clutchless drive connector that connects said air compressor to said engine or said electric current generator, said beltless drive connector including a gear box having at least one gear.

2. The unit as defined in claim 1, including an air accumulator tank at least partially mounted in said housing, said air accumulator is fluidly connected to said air compressor.

3. The unit as defined in claim 1, including a pressure monitor at least partially mounted on said housing to monitor air pressure generated by said air compressor.

4. The unit as defined in claim 2, including a pressure monitor at least partially mounted on said housing to monitor air pressure generated by said air compressor, contained in said air accumulator or combinations thereof.

5. The unit as defined in claim 1, wherein said gear box connects said air compressor to said engine.

6. The unit as defined in claim 2, wherein said gear box connects said air compressor to said engine.

7. The unit as defined in claim 4, wherein said gear box connects said air compressor to said engine.

8. The unit as defined in claim 1, wherein said gear box connects said air compressor to said electric current generator.

9. The unit as defined in claim 2, wherein said gear box connects said air compressor to said electric current generator.

10. The unit as defined in claim 4, wherein said gear box connects said air compressor to said electric current generator.

11. The unit as defined in claim 7, wherein said gear box includes a plurality of gears, said gear box having a single gear ratio.

12. The unit as defined in claim 10, wherein said gear box includes a plurality of gears, said gear box having a single gear ratio.

13. The unit as defined in claim 7, wherein said gear box includes a plurality of gear ratios, said gear ratios are manually selectable.

14. The unit as defined in claim 10, wherein said gear box includes a plurality of gear ratios, said gear ratios are manually selectable.

15. The unit as defined in claim 7, wherein said gear box includes a plurality of gear ratios, said gear ratios are automatically selectable.

16. The unit as defined in claim 10, wherein said gear box includes a plurality of gear ratios, said gear ratios are automatically selectable.

17. The unit as defined in claim 7, wherein said housing includes at least one electrical outlet for use by welding equipment and at least one air outlet for use by air powered tools.

18. The unit as defined in claim 10, wherein said housing includes at least one electrical outlet for use by welding equipment and at least one air outlet for use by air powered tools.

19. A method of providing compressed air from a portable integrated welder comprising:
   a. providing a housing that at least partially contains an engine at least partially mounted in said housing, said housing including wheels to enable said housing to be rolled over a ground surface;
   b. providing an electric current generator that is at least partially mounted in said housing and connected or interconnected to said engine to be at least partially driven thereby;
   c. providing an air compressor at least partially mounted in said housing; and
   d. providing a beltless and clutchless drive connector that is connected to said air compressor and said engine or said electric current generator to be at least partially driven thereby, said beltless drive connector including a gear box having at least one gear.

20. The method as defined in claim 19, including the step of providing an air accumulator tank that is at least partially mounted in said housing, said air accumulator is fluidly connected to said air compressor to at least partially accumulate compressed air generated by said air compressor.

21. The method as defined in claim 19, including the step of providing a pressure monitor at least partially mounted on said housing, said pressure monitor at least partially monitoring air pressure generated by said air compressor.

22. The method as defined in claim 20, including the step of providing a pressure monitor at least partially mounted on said housing, said pressure monitor at least partially monitoring air pressure generated by said air compressor, contained in said air accumulator, or combinations thereof.

23. The method as defined in claim 19, wherein said gear box connects said air compressor to said engine.

24. The method as defined in claim 20, wherein said gear box connects said air compressor to said engine.

25. The method as defined in claim 22, wherein said gear box connects said air compressor to said engine.

26. The method as defined in claim 19, wherein said gear box connects said air compressor to said electric current generator.

27. The method as defined in claim 20, wherein said gear box connects said air compressor to said electric current generator.

28. The method as defined in claim 22, wherein said gear box connects said air compressor to said electric current generator.

29. The method as defined in claim 25, wherein said gear box includes a plurality of gears, said gear box having a single gear ratio.

30. The method as defined in claim 28, wherein said gear box includes a plurality of gears, said gear box having a single gear ratio.

31. The method as defined in claim 25, wherein said gear box includes a plurality of gear ratios, said gear ratios are manually selectable.

32. The method as defined in claim 28, wherein said gear box includes a plurality of gear ratios, said gear ratios are manually selectable.

33. The method as defined in claim 25, wherein said gear box includes a plurality of gear ratios, said gear ratios are automatically selectable.

34. The method as defined in claim 28, wherein said gear box includes a plurality of gear ratios, said gear ratios are automatically selectable.

35. The method as defined in claim 25, including the step of including at least one electrical outlet on said housing for use by welding equipment and at least one air outlet for use by air powered tools.

36. The method as defined in claim 28, including the step of including at least one electrical outlet on said housing for use by welding equipment and at least one air outlet for use by air powered tools.

37. An integrated welder, generator and compressor unit comprising:
   a. a housing that at least partially contains components of said welder, generator and compressor;
   b. an engine at least partially mounted in said housing;

c. an electric current generator at least partially mounted in said housing and connected or interconnected to said engine to be at least partially driven thereby;

d. an air compressor at least partially mounted in said housing;

e. a pressure monitor at least partially mounted on said housing to monitor air pressure generated by said air compressor, contained in said air accumulator or combinations thereof and;

f. a beltless and clutchless connector that enables said engine to at least partially drive said air compressor, said connector including a gear box that connects said air compressor to said engine.

38. The unit as defined in claim 37, wherein said gear box includes a plurality of gears, said gear box having a single gear ratio.

39. The unit as defined in claim 38, wherein said housing includes at least one electrical outlet for use by welding equipment and at least one air outlet for use by air powered tools.

40. The unit as defined in claim 39, wherein said housing includes wheels to enable said housing to be rolled over a ground surface.

41. A method of providing compressed air from an integrated welder comprising:

a. providing a housing that at least partially contains an engine at least partially mounted in said housing;

b. providing an electric current generator that is at least partially mounted in said housing and connected or interconnected to said engine to be at least partially driven thereby;

c. providing an air compressor at least partially mounted in said housing;

d. providing a beltless and clutchless connector that enables said engine to at least partially drive said air compressor, said connector including a gear box that connects said air compressor to said engine;

e. providing a pressure monitor at least partially mounted on said housing, said pressure monitor at least partially monitoring air pressure generated by said air compressor, contained in said air accumulator, or combinations thereof; and, f. driving said air compressor at least partially by said engine.

42. The method as defined in claim 41, wherein said gear box includes a plurality of gears, said gear box having a single gear ratio.

43. The method as defined in claim 42, including the step of including at least one electrical outlet on said housing for use by welding equipment and at least one air outlet for use by air powered tools.

44. The method as defined in claim 43, including the step of providing wheels on said housing, said wheels enabling said housing to be rolled over a ground surface.

* * * * *